Patented Sept. 29, 1942

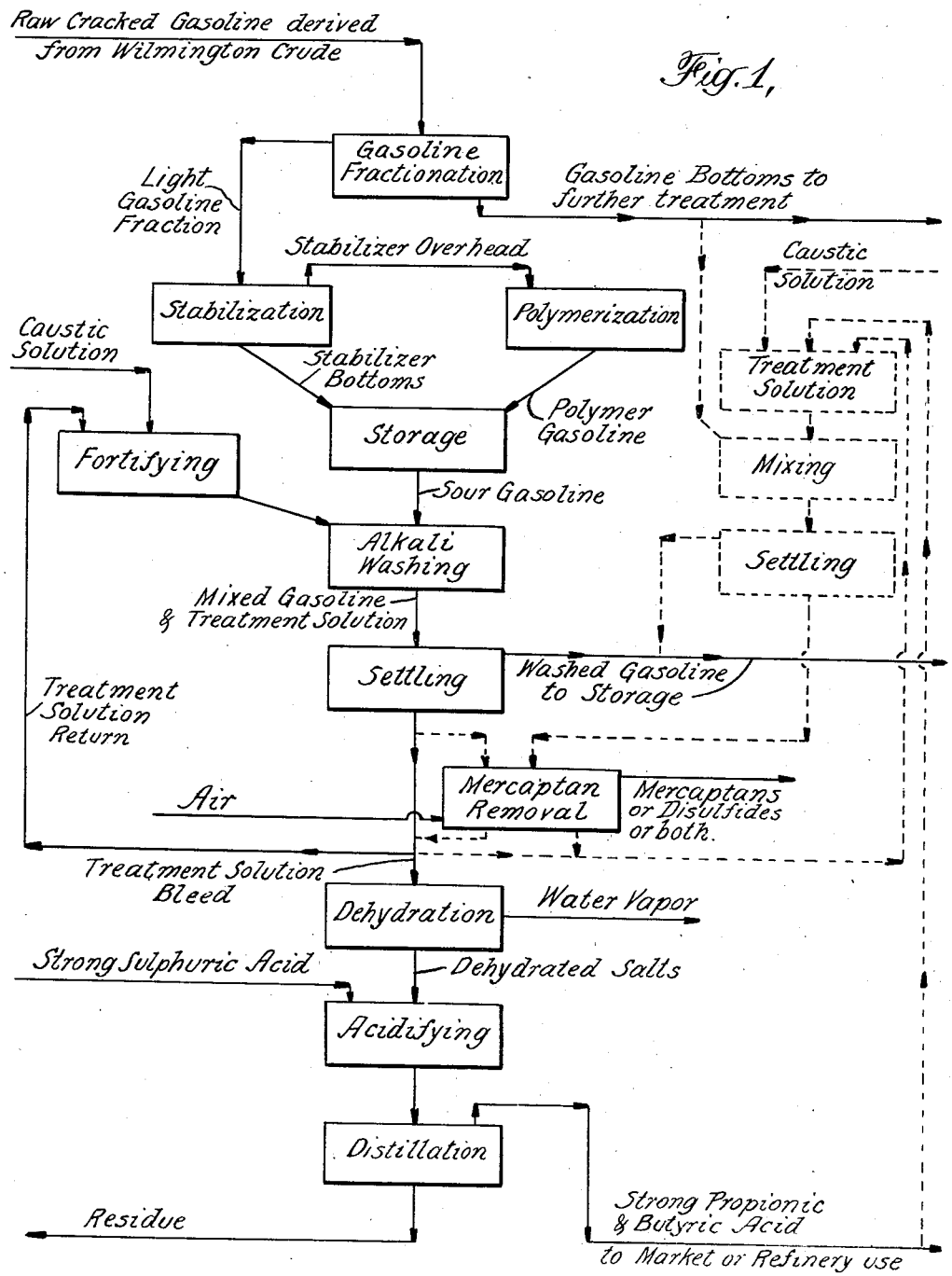

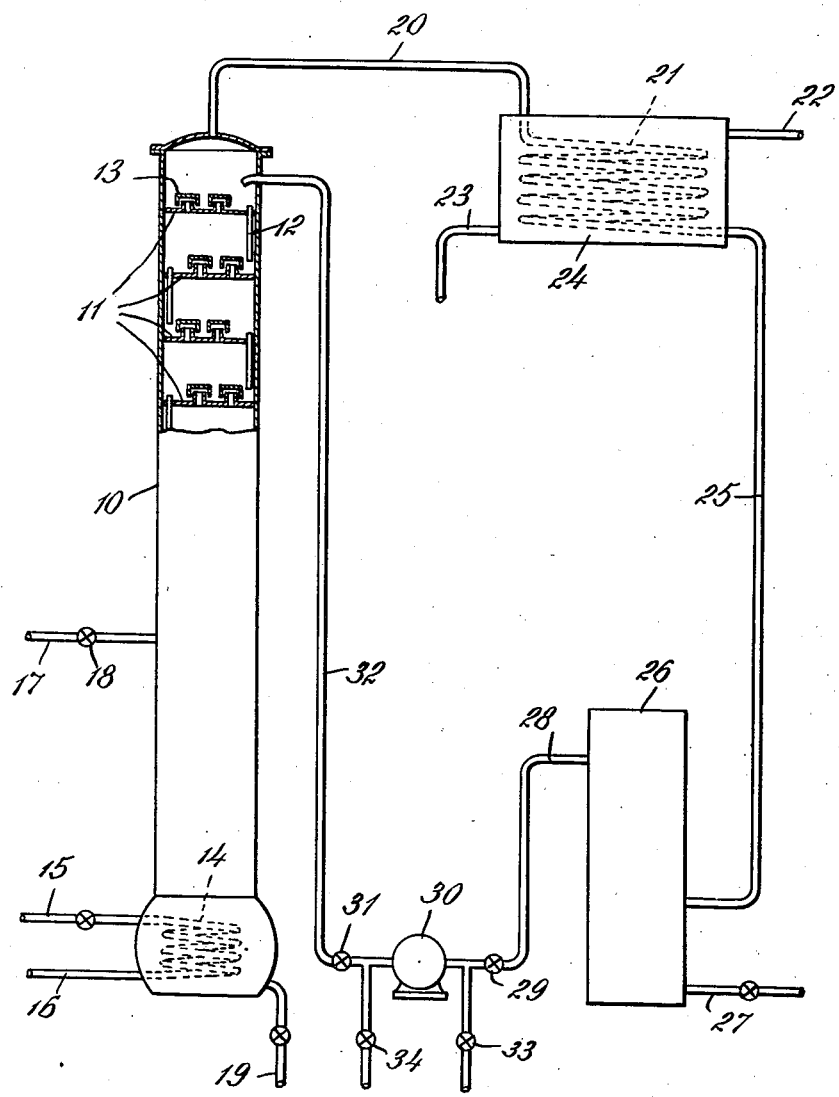

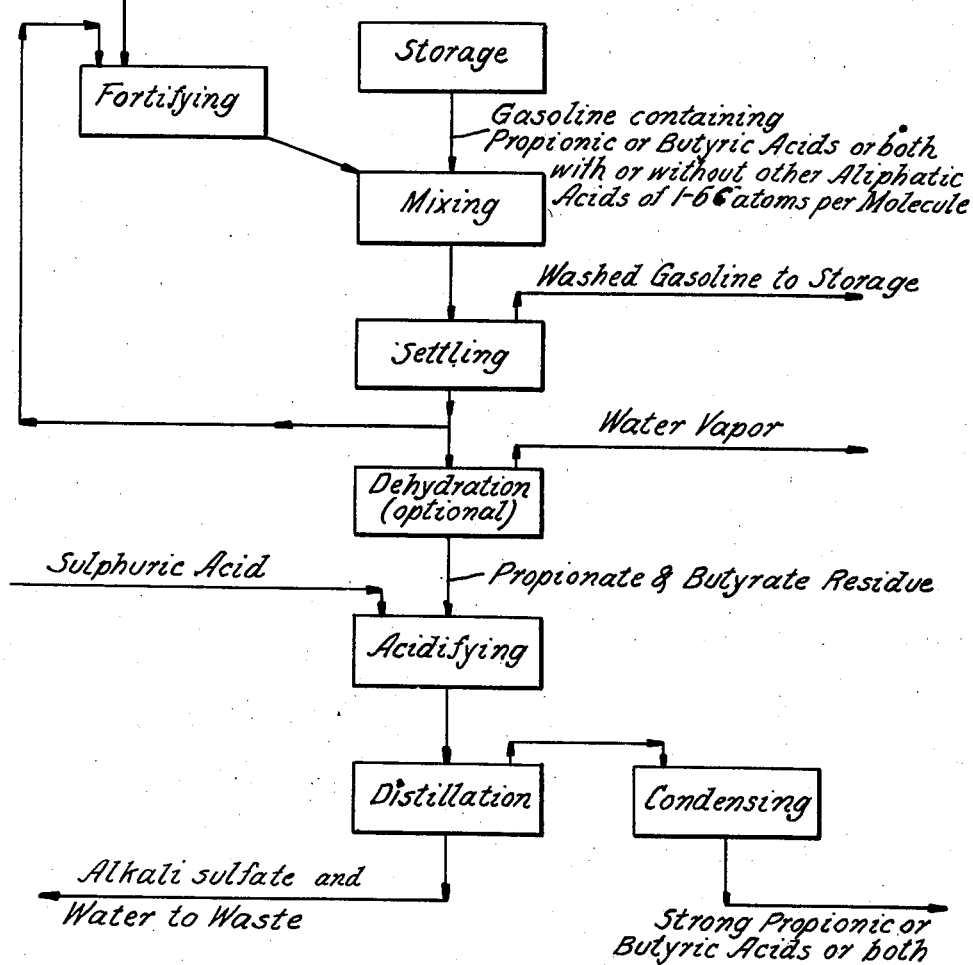

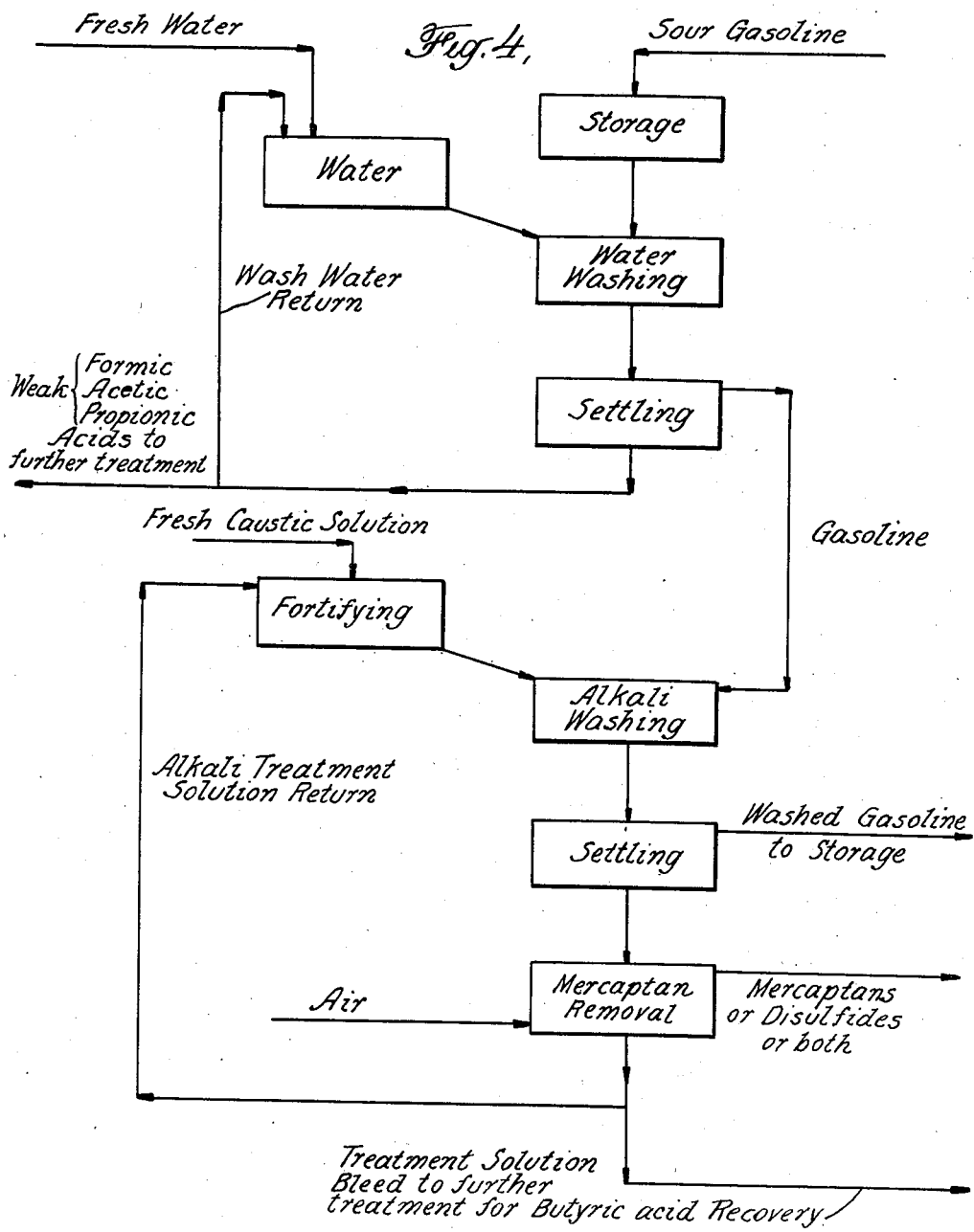

2,297,537

UNITED STATES PATENT OFFICE 2,297,537

PETROLEUM REFINING

Wallace A. Craig and Paul C. Rich, Los Angeles, Calif., assignors to Richfield Oil Corporation, Los Angeles, Calif., a corporation of Delaware Application February 17, 1940, Serial No. 319,436

2 Claims. (Cl. 196—32)

This invention is concerned with the treatment of petroleum products to extract impurities therefrom and is concerned particularly with the extraction and utilization of certain aliphatic acids and especially the mono-carboxylic acids having three or four carbon atoms (i. e., propionic acid and the butyric acids) from such products.

In the thermal cracking of petroleum, the resulting products, such as raw gasoline, frequently are contaminated with mercaptans, and it has been proposed heretofore to extract these contaminants by treating the products with aqueous alkaline solutions, such as potassium hydroxide solution. It has also been proposed to add to such solutions certain "solubilizers" or "solutizers," for example, certain iso-butyrates, to aid in the extraction of the mercaptans.

We have discovered that in the treatment of the products of thermal cracking of some petroleums, for example, certain Los Angeles Basin crude oils, it is unnecessary to add such "solubilizers" to the aqueous alkaline treatment solution from an exterior source. Thus, we have found that in the cracking of some petroleums the formation of mercaptans is accompanied by the formation of certain mono-carboxylic acids, particularly propionic acid, butyric acid and iso-butyric acid, together with other aliphatic acids having six or less carbon atoms per molecule, for example, formic, acetic, and sometimes valeric acids; that the propionic acid and the butyric acids are miscible with and are dissolved in the normally liquid products of the cracking (such as raw gasoline) at the concentrations at which they are produced; that these acids distill with the fraction of the products that boils below about 200° F. and may thus be concentrated in this fraction; that the treatment of fractions containing these acids with water or aqueous alkaline solutions tends to extract these acids; and that treatment with alkaline aqueous solutions tends to extract both mercaptans and the mono-carboxylic acids, which latter react with the alkali to form water soluble salts of the acids. We have discovered, moreover, that by bringing the alkaline solutions repeatedly or cyclically into contact with successive portions of the hydrocarbons containing the acids and adding to the solutions additional alkali to compensate for the neutralization brought about by the acids in the solution, it is possible to build up in the solution optimum concentrations of both alkali and water soluble salts of propionic acid or the butyric acids, or both, so as to obtain the benefits of the latter compounds as "solubilizers" in mercaptan extraction without adding them from an outside source. We have developed a cyclic process in which the propionate or butyrate contents of the solution is built up to the desired concentration in the solution through repeated contact with successive portions of hydrocarbons containing the corresponding mono-carboxylic acids. The desired concentration thus having been attained, it is maintained by withdrawing from the cycle a portion of the solution and returning the remainder to the cycle after fortification with additional alkali to compensate for the decrease in alkalinity of the solution that is incident to the extraction of the acids.

The propionic and butyric acids extracted from the petroleum hydrocarbon products in accordance with our invention (either separately or together with each other or with still other aliphatic acids having six or less carbon atoms per molecule, for example, formic, acetic and the valeric acids) may be recovered and utilized in several ways. Thus, solutions containing propionic or the butyric acids or their alkali salts, (i. e., ammonium, sodium or potassium propionates or butyrates) obtained in the treatment of petroleum products may be utilized directly by employing them to make up alkaline solutions for mercaptan extraction from petroleum hydrocarbons that contain initially no or insufficient "solubilizers," (for example, petroleum products such as raw gasoline that contain, as derived from cracking, little or no propionic or butyric acids). When the point of utilization of the extracted acids is remote from the locality in which they are extracted (for example, in another oil refinery), it may be desirable or necessary to concentrate the solutions. Concentration may be accomplished simply by evaporating water from the solution of propionate or butyates resulting from the extraction, or, preferably, the acids may be regenerated in the solutions and recovered by distillation. Thus, strong acid solutions or, if necessary, the anhydrous acids may be recovered and utilized for mercaptan extraction or for other purposes.

We have also discovered that, as described and claimed in our copending application Serial No. 319,437, filed February 17, 1940, water washing has a selective effect in extracting the various aliphatic acids. Thus, with a water wash that is substantially neutral or at least not decidedly alkaline, it is possible to extract formic acid, acetic acid and propionic acid to a greater extent than the butyric acids, so that, if desired, the product to be treated, say sour gasoline, may be given a first wash with water followed by a second wash with a caustic solution. The bulk of the formic and acetic acids, together with some of the propionic acid but with little of the butyric acids, is thus extracted in the first wash, and the second washing treatment results in the separation of a product with a relatively high content of the butyric acids, as compared with its content of the other acids. These and other features of our inventions will be more thoroughly understood through reference to the following detailed description, taken in conjunction with the accompanying drawings in which:

Fig. 1 is a flow sheet of an application in an oil refinery of the process of our invention for the extraction and utilization of propionic or butyric acids or both from a petroleum hydrocarbon;

Fig. 2 is a diagrammatic sectional elevation of a rectification column adapted for the production of strong or anhydrous proprionic or butyric acids from the relatively weak solutions in which these acids are extracted from petroleum products;

Fig. 3 is a flow sheet of a modification of the process of Fig. 1 as employed in treatment of a hydrocarbon containing little or no mercaptans; and Fig. 4 is a flow sheet of a modification of the process of Fig. 1 in which propionic acid (with or without formic and acetic acids) is extracted by a water wash prior to treatment of the hydrocarbons with an alkali solution to extract the butyric acid or acids.

Whether or not a product of petroleum cracking will contain initially aliphatic acids, such, for example, as formic, acetic, propionic or one or both of the butyric acids depends, we believe, principally upon the nature of the petroleum, which in turn is dependent upon the field from which it was produced. Thus, crude oil from the Wilmington (California) field is converted by cracking into products containing substantial proportions of these acids, and the same is true with respect to crudes from other fields in the Los Angeles Basin. On the other hand, crudes from fields in certain other sections of the country do not yield products containing appreciable quantities of these acids even though subjected to cracking and subsequent treatment in identical apparatus. However, in those cases in which the acids do occur in the products of thermal cracking, these products offer a convenient source of "solubilizer" for utilization in mercaptan extraction with alkaline solution, for both the alkali propionates and butyrates are effective as "solubilizers" or "solutizers," as they are sometimes called. Moreover, there is a substantial market for aliphatic acids and their salts, for other purposes.

To consider the process or our invention as applied to a sour gasoline containing both mercaptans and the mono-carboxylic acids of three or four carbon atoms with which we are principally concerned (i. e., propionic acid, butyric acid and iso-butyric acid) reference is made to Fig. 1. As shown in the flow sheet, a crude cracked gasoline derived from a Wilmington crude is subjected to fractional distillation in conventional apparatus to produce a light gasoline fraction and a gasoline bottoms product. Since the propionic and the butyric acids are relatively volatile, they distill with the light fraction at a temperature below about 200° F. Most of the mercaptans also tend to distill with the light, overhead product. (Of the mercaptans existent in sour gasoline, ethyl, propyl and iso-propyl tend to predominate. These distill principally with the light fraction. Butyl mercaptans may be found in both light and heavy fractions of the gasoline Amyl mercaptans or still heavier mercaptans tend to remain in the heavy fraction. Methyl mercaptans is so volatile that it tends to be completely driven off when the light fraction is stabilized.) The light fraction containing these acids and contaminated with mercaptans is sent to a conventional stabilization treatment. The overhead product of this treatment is subjected to polymerization, and the resulting polymer gasoline plus the stabilizer bottoms is blended in storage to produce a sour gasoline from which both the mercaptans and the acids are to be removed.

As disclosed in our copending application, we have found that the formic acid and acetic acid contents of the light gasoline fraction sent to stabilization tend to be driven off with the stabilizer overhead. A large part of these acids may be removed by subjecting the stabilizer overhead to water washing (not shown) prior to subjecting the overhead to polymerization, thus preventing these acids from exerting a corrosive action in vessels and conduits of the refinery and separating them, at least in part, from the butyric acids and the propionic acids.

The sour gasoline from storage is sent to an alkali washing operation where it is agitated in the presence of an alkaline solution (preferably of sodium or potassium hydroxide) which extracts from the gasoline both mercaptans and the mono-carboxylic acids, neutralizing the latter to form the alkali salts thereof. The alkali solution, as it is brought into contact with the gasoline, should have a concentration ranging approximately from 1 normal to 5 normal. The mixture of gasoline and treatment solution is passed into a settler, from the upper portion of which the treated gasoline is decanted and sent to further processing, if necessary. The treatment solution, with a diminished alkalinity but enriched by the alkali salts of the extracted acids and any extracted mercaptans, collects in the bottom of the settler and is withdrawn.

At this point the withdrawn solution may be subjected to aeration or other conventional treatment to remove any extracted mercaptans, and then all or part of the solution is recycled, being fortified prior to its reintroduction into the washing operation with caustic soda or other strong alkali. When the content of propionate or butyrates or both in the solution has reached a satisfactory concentration due to recirculation, a portion of the solution is bled out of the circuit, continuously or periodically, and its propionate and butyrate contents are recovered.

The recovery of propionic acid and the butyric acids is illustrated schematically in Fig. 1, and in general, the operation is as follows:

If desired, the propionate-butyrate solution is first dehydrated, in whole or in part, by evaporation, thus producing a more concentrated material for processing, or in fact, for use as "solubilizer" without regenerating the acids. If regeneration is carried out, and this is preferable practice, the propionates and butyrates are converted into their corresponding acids by the addition of a strong and relatively non-volatile acid, such as sulphuric, and the resulting acid solution is subjected to distillation to drive off as concentrated vapors the propionic and butyric acids or alternatively (and with the use of a third component, in the distillation) to drive off the water and the third component and leave the acid.

To consider a specific instance, the solution bled from the circuit may contain from 2 to 3 gram mols of propionate and butyrates, and up to 5 gram mols of alkali hydroxide per liter of solution. This solution is subjected to heat to evaporate the water and produce a substantially dry residue. Sulphuric acid of about 66° Baumé is added in excess to the residue. Propionic and butyric acids are thus regenerated in the residue, which is then heated in a still, the acids being driven off as vapors and condensed to yield a substantially anhydrous product.

If desired, dehydration, acidification, and distillation of the regenerated acids can all be conducted in the same still. After a batch has been treated in this still to drive off the organic acids, the residue is flushed out of the still with water, and another batch is treated.

To take an example in which dehydration of the solution is not practiced, the solution bled from the alkali washing cycle and containing alkali propionate and butyrate equivalent to 2 to 3 gram mols per liter is acidified with sulphuric acid until the resultant mixture has a pH of approximately 4, i. e., shows an acid reaction to methyl orange indicator. The mixture is then heated in a still connected to a condenser, heating being continued until a predetermined amount of the acids has collected in the condenser, when the residual content of the still is allowed to cool and is removed, water being admitted to flush out the residual contents, if necessary. This mode of operation will produce a solution of the mono-carboxylic acids containing approximately 3 gram mols per liter of the combined acids.

To consider a still further modification of the recovery method of our invention and one that is capable of producing strong or even anhydrous acid without resort to dehydration of the solution prior to acidification, reference should be made to Fig. 2. In the apparatus there illustrated, there is provided a conventional fractionating bubble tower or rectifying column 10 provided with a series of superimposed trays 11. The trays have nipples 12 of conventional form for carrying liquid down the column and conventional bubble caps 13 for promoting contact between vapors and liquids. A heating coil 14 is disposed in the bottom of the column. Heating medium, such as steam, is circulated through the coil by means of the valved inlet pipe 15 and the outlet line 16.

The material to be distilled in the column is a relatively weak solution of propionic acid or butyric acid or both produced by washing a suitable petroleum hydrocarbon as described hereinbefore, for example, the solution of approximately 3 normal acids produced by the methods described in the previous example. The solution is fed into the mid section of the tower through a feed line 17 provided with a control valve 18.

Residue (i. e., the concentrated acids) from the distillation operation conducted in the column is drained out of the bottom of the column through the valved outlet pipe 19, and a vapor pipe 20 connects the top of the still to a water-jacketed condenser 21 provided with inflow line 22 and drain line 23 connected to the jacket 24 for the cooling water. Condensate produced in the condenser is drained through a pipe 25 to a separator 26 of conventional form which has a valved lower outlet 27 for withdrawal of water and upper outlet 28 for withdrawal of liquids lighter than water.

The valved upper outlet is connected through a valve 29 to a pump 30, the discharge of which is connected through a valve 31 and a reflux pipe 32 to the upper portion of the column. A valved line 33 is connected to the inlet side of the pump between the pump and the valve 29 and serves to introduce into the system from storage (not shown) a so-called third component, as described in detail hereinafter. A valved line 34 is connected to the discharge side of the pump ahead of the valve 31 and serves to return excess of the third component to the storage.

Some of the organic acids with which we are concerned (for example, butyric acid) form constant boiling mixtures with water and so cannot be concentrated to the anhydrous state by simple distillation or rectification. The anhydrous acids can, however, be produced by employing in the distillation a third component, such as benzene, toluene, or xylene which will carry off the water, leaving the organic acids behind.

In carrying out such practice in the apparatus shown in Fig. 2 an aqueous solution of propionic acid or butyric acids or both (produced as described herein) is introduced into the mid portion of the column, the rate of introduction being controlled by means of the feed valve. The feed solution travels downward in the lower portion of the column countercurrent to the rising vapors of water and the hot organic acids generated by means of the coil in the lower or heater section of the column. When the mixture of organic acid and water vapors rise into the upper portion of the column they come into countercurrent contact with a reflux which includes the third component (such as benzene, toluene, or xylene) supplied to the distillation, this third component being introduced into the top of the column by means of the pump. The third component is, as explained hereinbefore, a component which will allow the water to pass out of the column as vapor but prevent the acids from doing the same. In other words, in the upper portion of the column the third component is vaporized and the organic acids are condensed by thermal interchange, a mixture of vapors of water and of the third component being withdrawn from the top of the column and passed to the condenser. Both water and the third component are condensed in the condenser and passed downward therefrom into the separator. In the separator the water and the third component (which preferably is substantially immiscible with the water, as are benzene, toluene, and xylene) are separated. The third component, assuming that it has a lower specific gravity than water, (as is the case with benzene, toluene, and xylene), is decanted from the upper portion of the separator while the water is withdrawn from the bottom of the separator. The decanted third component is then returned to the top of the column. The quantities of third component in the cycle may be regulated by introducing additional of the third component through the line 33, or by withdrawing excess of the third component through the line 34.

The organic acids condensed in the upper portion of the column pass downwardly through the column and are withdrawn as a concentrated solution in the third component or in a substantially anhydrous condition from the bottom of the column. If withdrawn as a solution in say, xylene, the anhydrous acid may be derived in a further fractional distillation.

The acids recovered by any of the methods described hereinbefore may be subjected to further fractional distillation if it is desired to separate the propionic acid from the butyric acids. However, for use as "solubilizer" in mercaptan extraction a relatively strong solution of the mixed acids (say 3 normal or higher) is quite satisfactory and the concentrated mixtures of the acid may be marketed for this purpose.

To refer again to Fig. 1, it will be observed that the gasoline bottoms produced in the gasoline fractionation are relatively free of propionic and butyric acids due to the fact that these tend to pass over with the light fraction of gasoline distillate which is sent to stabilization. However, the gasoline bottoms may contain substantial quantities of mercaptan and these mercaptans may be removed by treatment with an alkali solution, as indicated by the dotted portion of Fig. 1, the effect of the alkali being supplemented by adding thereto a portion of the propionic and butyric acids extracted from the light fraction, as described hereinbefore. Thus, if desired, a portion of the treatment solution used for washing the light fraction may be mixed with caustic to produce a treatment solution for the heavy fraction or gasoline bottoms. This second treatment solution is mixed with a portion of the gasoline bottoms; after the gasoline bottoms have been thus washed a settling operation is performed; the washed gasoline is decanted and sent to storage separately, or (if desired) with the washed gasoline resulting from the light fraction of the secondary distillation. The second treatment solution from this latter settling operation may be recycled with additional quantities of gasoline bottoms and a portion thereof sent to mercaptan removal, as illustrated. Instead of employing the propionate-butyrate solution, a proportion of the strong propionic or butyric acids recovered in the condensing operation may be employed, this being mixed with the treatment solution for treating the gasoline bottoms (as shown).

If the raw gasoline or other product to be treated for extraction of propionic acid, butyric acids, or both, does not contain substantial quantities of mercaptan, or if substantially all of the mercaptans present in the raw gasoline are left in the gasoline bottoms product in fractionation, the process is conducted as shown in Fig. 3 wherein the light fraction (after stabilization and polymerization) is subjected to alkali washing and settlement, the washed gasoline being sent to storage and a portion of the alkali solution being recirculated to build up the concentration of salts of the mono-carboxylic acids in the solution. No mercaptan removal is practiced, however, and when the concentration of propionate or butyrate, or both, in the cycle has built up to the desired point, a portion of the circulating load of treatment solution is bled off, continuously or periodically, and sent to the acid recovery operation.

As we have indicated hereinbefore, the various acids in the acid product recovered may be separated from each other by fractional distillation. An alternative procedure for producing propionic acid and the butyric acids separately is illustrated in Fig. 4. Referring now to this figure, it will be observed that the sour gasoline from storage is first subjected to a water wash to extract propionic acid (together with formic and acetic acids, if these are present) in preference to the butyric acids. The mixture of water and gasoline is then settled, the gasoline being decanted and sent to an alkali washing operation while the water, providing it has a sufficiently high propionic acid content, is removed from the circuit and subjected to acid recovery operations. If the propionic acid content of the water is too low, all, or a portion of the water is recirculated in contact with additional portions of the sour gasoline. As indicated hereinbefore, we have found that water washing tends to remove formic, acetic, and propionic acids while leaving the butyric acids behind, and the wash water in the above-described fashion contains a substantially large proportion of one or more of these acids as compared with the proportion of butyric acids therein. The wash water may be treated to recover its various acid constituents separately, if this is desired. Thus, formic and acetic acids may be substantially separated from each other or from the propionic acid by fractional distillation.

As indicated above, after water washing, the gasoline is subjected to alkali washing with the caustic soda solution, or other aqueous solution of strong alkali, in the same manner as shown in Fig. 1 or 3. In other words, the gasoline is agitated with the aqueous alkaline solution and then subjected to settling. The washed gasoline is decanted in the settling operation and the treatment solution, now containing dissolved butyrates, is sent (with or without mercaptan removal, as the case may require) back for further contact with additional quantities of the gasoline. Fortification of the solution with fresh caustic is practiced as in the operations described in Figs. 1 and 3 and when a sufficient concentration of butyric acid has been developed in the circulating solution a portion thereof is bled from the circuit and subjected to acid recovery operations in any of the ways previously described.

We claim:

1. In the treatment of a petroleum hydrocarbon product containing a light mercaptan and a heavy mercaptan and a mono-carboxylic acid selected from the group consisting of propionic and the butyric acids, the improvement which comprises subjecting the hydrocarbon product to fractional distillation to produce a low-boiling fraction containing the acid and the light mercaptan and a high-boiling fraction containing the heavy mercaptan, circulating an aqueous solution of alkali metal hydroxide in contact with the low-boiling fraction in a circuit to extract the acid and light mercaptan therefrom, fortifying the circulated solution by adding thereto controlled amounts of alkali metal hydroxide to maintain in the solution brought into contact with the low-boiling fraction a hydroxide concentration of about 1 normal to about 5 normal, withdrawing from the circuit controlled amounts of the solution containing the extracted light mercaptan and also containing alkali metal salt of the acids in a concentration of about 2 to about 3 gram mols per liter, and bringing the high boiling fraction into contact with the solution of the alkali metal salt thus withdrawn to extract the heavy mercaptan from the high-boiling fraction and aerating the solution to extract the mercaptan therefrom.

2. In the treatment of a petroleum hydrocarbon product containing a light mercaptan, a heavy mercaptan and a mono-carboxylic acid selected from the group consisting of propionic acid and the butyric acids, the improvement which comprises subjecting the hydrocarbon product to fractional distillation to produce a low-boiling fraction containing the acid and the light mercaptan and a high boiling fraction containing the heavy mercaptan, circulating an aqueous solution of alkali metal hydroxide in contact with the low-boiling fraction in a circuit to extract the acid and the light mercaptan therefrom, fortifying the circulated solution by adding thereto controlled amounts of alkali metal hydroxide to maintain in the solution brought into contact with the low-boiling fraction a hydroxide concentration of about 1 normal to about 5 normal, withdrawing from the circuit controlled amounts of solution containing the extracted light mercaptan and also containing alkali metal salts of the acids in a concentration of about 2 to about 3 gram mols per liter, circulating the solution thus withdrawn in contact with the high boiling fraction to extract the heavy mercaptan therefrom, separating the solution from the high boiling fraction after circulation in contact therewith, aerating the solution to remove mercaptan therefrom and treating the solution after it has been in contact with both the high-boiling fraction and the low-boiling fraction to recover the acids from the solution.

WALLACE A. CRAIG.
PAUL C. RICH.